United States Patent
Wang et al.

(10) Patent No.: US 9,218,850 B1
(45) Date of Patent: Dec. 22, 2015

(54) EXCHANGE BREAK LAYER FOR HEAT-ASSISTED MAGNETIC RECORDING MEDIA

(71) Applicant: WD Media, LLC, San Jose, CA (US)

(72) Inventors: Bincheng Wang, Sunnyvale, CA (US); Alexander S. Chernyshov, San Jose, CA (US); Hua Yuan, San Jose, CA (US); Antony Ajan, San Jose, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/581,274

(22) Filed: Dec. 23, 2014

(51) Int. Cl.
| | |
|---|---|
| *G11B 11/00* | (2006.01) |
| *G11B 33/14* | (2006.01) |
| *G11B 5/48* | (2006.01) |
| *G11B 5/65* | (2006.01) |
| *G11B 5/725* | (2006.01) |
| *G11B 5/68* | (2006.01) |
| *G11B 5/84* | (2006.01) |
| *G11B 5/00* | (2006.01) |

(52) U.S. Cl.
CPC .......... *G11B 33/1406* (2013.01); *G11B 5/4866* (2013.01); *G11B 5/653* (2013.01); *G11B 5/68* (2013.01); *G11B 5/725* (2013.01); *G11B 5/8408* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,914,198 A | 6/1999 | Miyamoto et al. |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |

(Continued)

OTHER PUBLICATIONS

Yiming Wang, et al., "SNR Impact of Media Anisotropy Near Curie Temperature in Heat-Assisted Magnetic Recording," IEEE Xplore Digital Library (IEEE Trans. on Magnetics), vol. 47, Issue: 10 Oct. 2011, Abstract.

*Primary Examiner* — Tan X Dinh (57) ABSTRACT

A heat-assisted magnetic recording (HAMR) medium having improved signal-to-noise ratio capabilities includes a high-temperature exchange break layer (EBL) inserted between magnetic recording layers, where the high-temperature exchange break layer material is capable of maintaining its chemical properties at temperatures exceeding 300° C. The high-temperature EBL may include a non-metallic compound including at least one of an oxide, a carbide, and a nitride.

19 Claims, 3 Drawing Sheets

(56) References Cited

U.S. PATENT DOCUMENTS

| | | |
|---|---|---|
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,830,824 B2 | 12/2004 | Kikitsu et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,773,331 B2 | 8/2010 | Akagi et al. |
| 7,833,639 B2 | 11/2010 | Sonobe et al. |
| 7,833,641 B2 | 11/2010 | Tomiyasu et al. |
| 7,880,996 B2 * | 2/2011 | Stipe ............................... 360/59 |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,084,149 B2 | 12/2011 | Soeya |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B2 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,320,232 B1 * | 11/2012 | Marinero et al. ............ 369/288 |
| 8,331,056 B2 | 12/2012 | O'Dell |

(56) References Cited

U.S. PATENT DOCUMENTS

| | | |
|---|---|---|
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 * | 10/2013 | Bertero et al. ............ 369/13.38 |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,710,604 B2 | 4/2014 | Yamakawa et al. |
| 8,711,499 B1 | 4/2014 | Desai et al. |
| 8,724,434 B2 | 5/2014 | Matsuzaki et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2003/0108721 A1 | 6/2003 | Fullerton et al. |
| 2004/0022387 A1 | 2/2004 | Weikle |
| 2004/0132301 A1 | 7/2004 | Harper et al. |
| 2004/0185307 A1 | 9/2004 | Oikawa et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0037016 A1 | 2/2007 | Do et al. |
| 2007/0070549 A1 | 3/2007 | Suzuki et al. |
| 2007/0217071 A1 | 9/2007 | Inamura et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0074062 A1 | 3/2010 | Kamijima et al. |
| 2010/0110576 A1 | 5/2010 | Akagi et al. |
| 2010/0143752 A1 | 6/2010 | Ishibashi et al. |
| 2010/0177426 A1 | 7/2010 | Kanegae |
| 2010/0182714 A1 | 7/2010 | Kanbe et al. |
| 2010/0190035 A1 | 7/2010 | Sonobe et al. |
| 2010/0195249 A1 | 8/2010 | Tsuda |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0063278 A1 | 3/2012 | Hirata et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0147718 A1 * | 6/2012 | Hellwig et al. ............ 369/13.33 |
| 2012/0148139 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0225325 A1 | 9/2012 | Nemoto et al. |
| 2012/0236694 A1 * | 9/2012 | Hellwig et al. ............ 369/13.33 |
| 2012/0251842 A1 | 10/2012 | Yuan et al. |

(56) References Cited

U.S. PATENT DOCUMENTS

| | | |
|---|---|---|
| 2012/0251846 A1 | 10/2012 | Desai et al. |
| 2012/0276417 A1 | 11/2012 | Shimokawa et al. |
| 2012/0307398 A1 | 12/2012 | Kanbe et al. |
| 2012/0308722 A1 | 12/2012 | Suzuki et al. |
| 2013/0028061 A1* | 1/2013 | Rosen et al. ............. 369/13.32 |
| 2013/0040167 A1 | 2/2013 | Alagarsamy et al. |
| 2013/0071694 A1 | 3/2013 | Srinivasan et al. |
| 2013/0084387 A1* | 4/2013 | Hellwig et al. ............. 427/130 |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0104997 A1 | 4/2014 | Shibata et al. |
| 2014/0151360 A1 | 6/2014 | Gregory et al. |
| 2014/0234666 A1 | 8/2014 | Knigge et al. |
| 2014/0272473 A1* | 9/2014 | Chen et al. ............. 428/839.6 |

* cited by examiner

EXCHANGE BREAK LAYER FOR HEAT-ASSISTED MAGNETIC RECORDING MEDIA

FIELD OF EMBODIMENTS

Embodiments of the invention may relate generally to hard disk drives and more particularly to magnetic recording media.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) is a technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature near the Curie temperature, at which the medium effectively loses coercivity and a realistically achievable magnetic write field can write data to the medium.

In order to improve the recording performance for media, including HAMR media, it is desirable to increase the SNR (Signal-to-Noise Ratio) through structure design and materials selections.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a heat-assisted magnetic recording (HAMR) medium having a high-temperature exchange break layer are described. In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the embodiments described herein.

Physical Description of Illustrative Operating Environments

Embodiments may be used in the context of a heat-assisted magnetic recording (HAMR) medium in a hard-disk drive (HDD) data storage device. Thus, in accordance with an embodiment, a plan view illustrating an HDD 100 is shown in FIG. 1 to illustrate an examplary operating environment.

Figure 1:
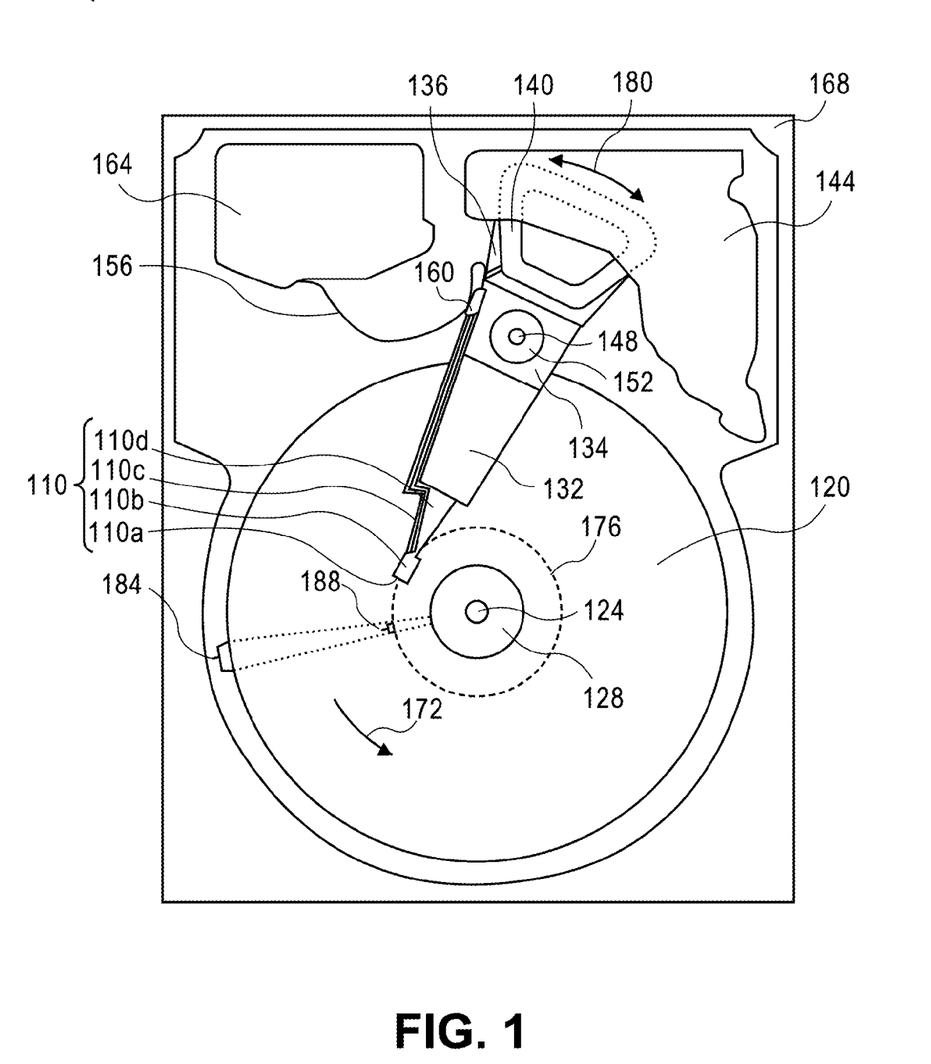
FIG. 1 is a plan view illustrating a hard disk drive, according to an embodiment.

FIG. 1 illustrates the functional arrangement of components of the HDD 100 including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording medium 120 rotatably mounted on a spindle 124 and a drive motor (not visible) attached to the spindle 124 for rotating the medium 120. The head 110a includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110, to access portions of the medium 120, being mounted on a pivot-shaft 148 with an interposed pivot-bearing assembly 152. In the case of an HDD having multiple disks, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a base, in conjunction with an HDD cover provides a sealed, protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector"), for example, sectored track portion 188. Each sectored track portion 188 may be composed of recorded data and a header containing a servo-burst-signal pattern, for example, an ABCD-servo-burst-signal pattern, which is information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Introduction

In the context of hard disk drive (HDD) technologies, one approach to a media structure for HAMR applications consists of adhesion, intermediate, magnetic, overcoat and lubricant layers, all stacked on a substrate. To improve the recording performance of HAMR media, media structure design and material selection are areas of interest. For example, areas of research have involved media structure design and material selection relating to the magnetic layer, the intermediate layer (e.g., the seed layer, underlayer, heat sink), etc.

As mentioned, increasing the signal-to-noise ratio (SNR) of media improves the performance of the media and, likewise, the performance of a corresponding HDD. However, further improvements to SNR through design or process optimization remain a challenge. Additionally, reducing transition jitter can improve the media performance, where jitter can be viewed as a result of irregular (i.e., deviatory from vertical) transitions between magnetic bits. Still further, as track widths typically decrease as areal density increases, the need for smaller and smaller head-media interface spacing (or "flying height") comes into play. Thus, smoother head and media surfaces are also desirable in order to enable lower flying heights.

Room temperature deposited FePt film forms A1 phase, which is not considered suitable for magnetic recording media. $L1_0$ FePt based alloys have been widely investigated for use in the magnetic layer(s) in heat-assisted magnetic recording (HAMR) media, one reason being because of their high magnetocrystalline anisotropy. However, current deposition processes for fabricating FePt based magnetic layers require deposition temperatures up to or exceeding 400° C. to form an ordered $L1_0$ phase for magnetic recording, but higher process temperatures often result in an increase of surface roughness. Thus, a multilayer design for FePt magnetic layer may be considered for the purpose of balancing recording performance and media roughness. However, stacking magnetic recording layers adjacent to each other can result in a strong magnetic coupling between two adjacent layers, which may cause difficulty with the writing process.

Exchange Break Layer for Heat-Assisted Magnetic Recording Media

Figure 2:
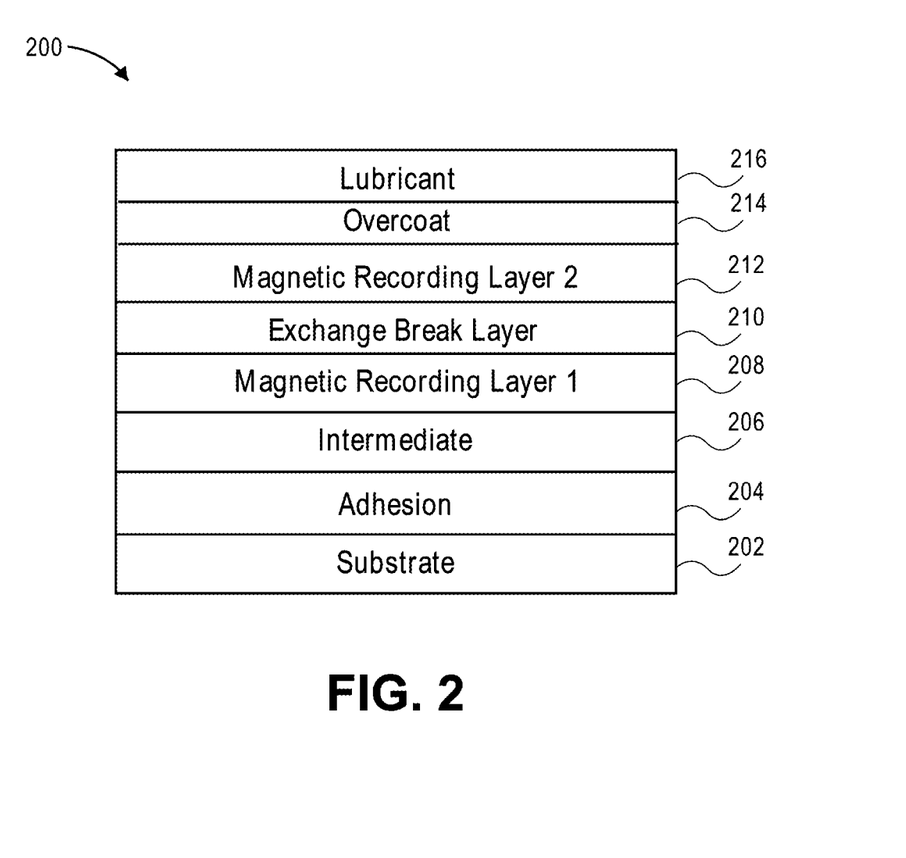
FIG. 2 illustrates a heat-assisted magnetic recording (HAMR) medium stack having an exchange break layer, according to an embodiment.

FIG. 2 illustrates a heat-assisted magnetic recording (HAMR) medium stack having an exchange break layer, according to an embodiment. The HAMR medium stack 200 includes a stacked structure with a bottom substrate 202, an adhesion layer 204 over or on the substrate 202, an intermediate layer 206 (e.g., a heat sink layer, etc.) over or on the adhesion layer 204, a magnetic recording layer over or on the intermediate layer 206, an overcoat layer 214 over or on or adjacent to the magnetic recording layer, and a lubricant layer 216 on the overcoat layer 214. A multi-layer magnetic recording layer is employed in the medium stack 200, comprising a first magnetic recording layer 208 ("magnetic recording layer 1") and a second magnetic recording layer 212 ("magnetic recording layer 2").

Reference herein to a "layer" is not intended to be thereby limited to a single layer, rather each "layer" referenced may actually comprise multiple layers, or a "stack" of thin film layers. Further, the terms "fabricated" and "formed" may include any of a number of thin film processes, such as chemical and/or physical deposition processes (of which sputtering is commonly used in hard disk media production), which "grow" grains of poly-crystalline thin films, for example, as well as may promote crystalline epitaxial growth, and the like. Therefore, use of these terms and related terms do not limit to any particular process, unless otherwise indicated.

According to an embodiment, HAMR medium stack 200 further comprises a high-temperature exchange break layer 210 over the first magnetic recording layer 208. The high-temperature exchange break layer 210 is "high-temperature", at least in part because it is capable of maintaining its chemical properties at temperatures exceeding 300° C. As discussed, for HAMR media, FePt based magnetic layers require deposition temperatures that may reach or exceed 400° C. to form an ordered $L1_0$ phase for magnetic recording. This is in contrast to deposition temperatures that are used in the fabrication of perpendicular magnetic recording (PMR) media, which currently typically use a stack of several Co-based magnetic layers, where deposition temperatures typically may reach temperatures as high as around 200° C.-300° C. Thus, the exchange break layers that are typical of and suitable for PMR media are not suitable for HAMR media, at least in part because of the HAMR media $L1_0$ FePt deposition temperatures (i.e., in practice the deposition process(es) may involve multiple temperature points) and the corresponding need for the exchange break layer 210 to maintain its own properties at such elevated temperatures. According to an embodiment, each of the first magnetic recording layer 208 and the second magnetic recording layer 212 comprise an $L1_0$FePt compound.

Furthermore, and according to an embodiment, the high-temperature exchange break layer 210 is further worthy of "high-temperature" classification because it comprises a compound that can withstand a temperature exceeding around 400° C. without substantial diffusion into the first and second magnetic layers 208, 212 which the exchange break layer 210 separates. Thus, the exchange break layer 210 of HAMR medium stack 200 should not "mix" with the magnetic layers 208, 212 in any reasonable, suitable fabrication scenario.

Consequently, metals are not considered good candidates for use in HAMR media due to the extremely high $L1_0$ FePt deposition temperatures. Thus, according to an embodiment, the high-temperature exchange break layer 210 comprises a non-metallic compound including at least one of an oxide, a carbide, and a nitride. Oxides, carbides, and nitrides are considered more stable than metals and less likely to diffuse into adjacent materials, such as the adjacent magnetic recording layers 208, 212 (e.g., FePt).

According to embodiments, suitable candidates for an oxide to use in exchange break layer 210 include, but are not limited to, MgO, $SiO_2$, $ZrO_2$, and the like. According to embodiments, suitable candidates for a carbide to use in exchange break layer 210 include, but are not limited to, TiC, TaC, VC, and the like. According to embodiments, suitable candidates for a nitride to use in exchange break layer 210 include, but are not limited to, TiN, TaN, WN, and the like.

HAMR Media with Exchange Break Layer and without

A comparison of a HAMR media stack having an exchange break layer (EBL) such as high-temperature exchange break layer 210 and a HAMR media stack not having an exchange break layer allowed for a comparison of the differences in the recording performance of the respective HAMR media stacks. For a non-limiting example, a sample containing an MgO EBL showed an improvement of SNR ~0.2 dB and decrease of jitter ~0.11 nm when compared to a sample without an EBL.

A comparison of a HAMR media stacks having an exchange break layer (EBL) such as high-temperature exchange break layer 210, at varying thicknesses and deposition temperatures, allowed for a comparison of the differences in the recording performance of the respective HAMR media stacks. For a non-limiting example, a sample EBL deposited at 550° C. and MgO ~0.6 nm showed an improvement of SNR and jitter when compared to a sample EBL deposited at 450° C. and MgO 0.6 nm and a sample EBL deposited at 450° C. and MgO 0.2 nm.

The insertion, into a HAMR media stack, of a high-temperature EBL layer (e.g., exchange break layer 210) of a particular material and thickness (e.g., 0.6 nm MgO) can partially break the coupling between magnetic recording layers (e.g., magnetic recording layers 208, 212) between which it is inserted. Furthermore, for example, a thinner EBL layer may not be enough to break the coupling, whereas a thicker EBL layer could change the $H_c$. EBL deposition temperatures and thicknesses may be optimized according to particular goals and constraints corresponding to particular media, media-head interface, hard disk drive requirements, and the like.

The insertion of a high-temperature EBL layer (e.g., exchange break layer 210) such as MgO into a HAMR media stack may also reduce the media surface roughness, which could further enable fabrication of a thicker first magnetic layer (Ml) and hence further increase of SNR. Research has shown an almost 1.0 Å reduction in media roughness from a sample having no EBL to a sample having a high-temperature EBL (e.g., 1.0 nm of MgO) when all the other sputter conditions are identical.

Based on the foregoing, according to various embodiments, a high-temperature exchange break layer (e.g., exchange break layer 210) and first and second magnetic recording layers (e.g., first and second magnetic recording layers 208, 212) are configured to (i) increase the signal-to-noise ratio (SNR) corresponding to a HAMR media stack (e.g., HAMR medium stack 200); and/or (ii) decrease the jitter corresponding to a HAMR media stack (e.g., HAMR medium stack 200); and/or (iii) decrease the surface roughness corresponding to a HAMR media stack (e.g., HAMR medium stack 200).

As discussed, the addition of the high-temperature exchange break layer 210 can enable an increase in the SNR and/or a reduction in the jitter and/or roughness of magnetic recording media. The HAMR medium stack 200 described in reference to FIG. 2 is well-suited for use in hard disk drive heat-assisted magnetic recording (HAMR) systems, wherein individual magnetic recording bit size and overall areal density are significant design goals. However, other types of energy-assisted media systems, especially those employing $L1_0$FePt magnetic layer(s), may also benefit from the use of a high-temperature exchange break layer in the respective media types.

Method of Manufacturing HAMR Recording Media

Figure 3:
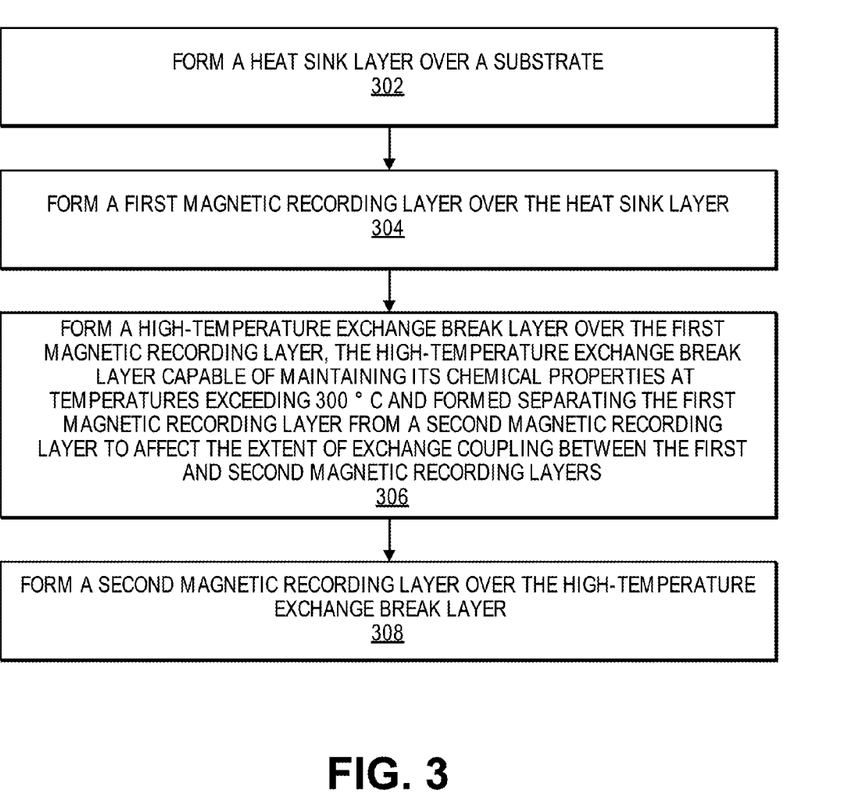
FIG. 3 is a flow diagram illustrating a method of manufacturing a HAMR medium, according to an embodiment.

Embodiments may be implemented in a HAMR hard disk drive including such HAMR media. FIG. 3 is a flow diagram illustrating a method of manufacturing a HAMR medium, according to an embodiment. One or more a sputtering process using a sputtering system can be used to fabricate various layers of the HAMR media stack described herein (e.g., HAMR media stack 200 of FIG. 2).

At block 302, a heat sink layer is formed over a substrate. For example, a heat sink intermediate layer 206 (FIG. 2) is formed over substrate 202 (FIG. 2). As noted in reference to FIG. 2, an adhesion layer 204 may also be fabricated on substrate 202 before forming the heat sink layer.

At block 304, a magnetic recording layer is formed over the heat sink layer. For example, first magnetic recording layer 208 (FIG. 2) is formed over a heat sink intermediate layer 206 (FIG. 2).

At block 306, a high-temperature exchange break layer is formed over the first magnetic recording layer, where the high-temperature exchange break layer comprises a material that is capable of maintaining its chemical properties at temperatures exceeding 300° C. and that is formed separating the first magnetic recording layer from a second, subsequent magnetic recording layer in order to affect the extent of magnetic exchange coupling between the first and the second magnetic recording layers. For example, high-temperature exchange break layer 210 (FIG. 2) is formed over the first magnetic recording layer 208 (FIG. 2), where the high-temperature exchange break layer 210 comprises a material that is capable of maintaining its chemical properties at temperatures exceeding 300° C. and that is formed separating the first magnetic recording layer 208 from a second, subsequent magnetic recording layer 212 (FIG. 2) in order to affect the extent of magnetic exchange coupling between the first and the second magnetic recording layers 208, 212.

At block 308, a second magnetic recording layer is formed over the high-temperature exchange break layer. For example, second magnetic recording layer 212 (FIG. 2) is formed over high-temperature exchange break layer 210 (FIG. 2).

As with aforementioned embodiments, the high-temperature exchange break layer 210 (EBL) formed at block 306 (i) may comprise a non-metallic EBL including at least one of an oxide, a carbide, and a nitride; and/or (ii) may comprise an EBL that can withstand a temperature exceeding around 400° C. without experiencing substantial diffusion into the first and second magnetic recording layers 208, 212 (FIG. 2). Further as with aforementioned embodiments, the high-temperature exchange break layer 210 (EBL) and the first and second magnetic recording layers 208, 212 are formed and configured to (i) increase the SNR corresponding to the recording medium as compared to a recording medium without the high-temperature exchange break layer; and/or (ii) decrease the jitter corresponding to the recording medium as compared to a recording medium without the high-temperature exchange break layer; and/or (iii) decrease the surface roughness corresponding to the recording medium as compared to a recording medium without the high-temperature exchange break layer.

Within the foregoing process, the deposition of layers can be performed using a variety of deposition sub-processes, for non-limiting examples, physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). Furthermore, other suitable deposition techniques known in the art may also be used.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A heat-assisted magnetic recording (HAMR) medium comprising:
   a substrate;
   a heat sink layer over said substrate;
   a first magnetic recording layer over said heat sink layer;
   a high-temperature exchange break layer over said first magnetic recording layer, said high-temperature exchange break layer capable of maintaining its chemical properties at temperatures exceeding 300° C.; and
   a second magnetic recording layer over said exchange break layer.

2. The HAMR medium of claim 1, wherein said high-temperature exchange break layer comprises a non-metallic compound including at least one of an oxide, a carbide, and a nitride.

3. The HAMR medium of claim 1, wherein said high-temperature exchange break layer comprises a compound that can withstand a temperature exceeding around 400° C. without substantial diffusion into said first and second magnetic recording layers.

4. The HAMR medium of claim 1, wherein said first and second magnetic recording layers each comprise an $L1_0$ phase FePt compound.

5. The HAMR medium of claim 1, wherein said high-temperature exchange break layer and said first and second magnetic recording layers are configured to increase the signal-to-noise ratio corresponding to said recording medium.

6. The HAMR medium of claim 1, wherein said high-temperature exchange break layer and said first and second magnetic recording layers are configured to decrease the jitter corresponding to said recording medium.

7. The HAMR medium of claim 1, wherein said high-temperature exchange break layer and said first and second magnetic recording layers are configured to decrease the surface roughness corresponding to said recording medium.

8. The HAMR medium of claim 1, comprising:
   an adhesion layer over said substrate;
   at least one intermediate layer over said adhesion layer, said intermediate layer including said heat sink layer, wherein said adhesion layer and said intermediate layer are below said first and second magnetic recording layers;
   an overcoat layer over and adjacent to said second magnetic recording layer; and
   a lubricant layer over said overcoat layer.

9. A data storage device comprising:
   a heat-assisted magnetic recording (HAMR) disk medium rotatably mounted on a spindle, said HAMR disk medium comprising:
   a substrate, a heat sink layer over said substrate, a first magnetic recording layer over said heat sink layer, a high-temperature exchange break layer over said first magnetic recording layer, said high-temperature exchange break layer capable of maintaining its chemical properties at temperatures exceeding 300° C., and a second magnetic recording layer over said exchange break layer;

a heat-assisted magnetic recording (HAMR) head slider comprising a magnetic write head configured to write to said HAMR disk medium;

a heat source coupled with said HAMR head slider; and a voice coil motor configured to move said HAMR head slider to access portions of said HAMR disk medium.

10. The data storage device of claim 9, wherein said high-temperature exchange break layer comprises a non-metallic compound including at least one of an oxide, a carbide, and a nitride.

11. The data storage device of claim 9, wherein said high-temperature exchange break layer comprises a compound that can withstand a temperature exceeding around 400° C. without substantial diffusion into said first and second magnetic recording layers.

12. The data storage device of claim 9, wherein said first and second magnetic recording layers of said HAMR disk medium each comprise an $L1_0$ phase FePt compound.

13. A method of manufacturing a heat-assisted magnetic recording (HAMR) medium, the method comprising:

forming a heat sink layer over a substrate;

forming a first magnetic recording layer over said heat sink layer;

forming a high-temperature exchange break layer over said first magnetic recording layer, said high-temperature exchange break layer capable of maintaining its chemical properties at temperatures exceeding 300° C.; and forming a second magnetic recording layer over said exchange break layer;

wherein said high-temperature exchange break layer is formed separating said first magnetic recording layer from said second magnetic recording layer to affect the extent of exchange coupling between said first magnetic recording layer and said second magnetic recording layer.

14. The method of claim 13, wherein forming said high-temperature exchange break layer comprises forming a non-metallic exchange break layer including at least one of an oxide, a carbide, and a nitride.

15. The method of claim 13, wherein forming said high-temperature exchange break layer comprises forming an exchange break layer that can withstand a temperature exceeding around 400° C. without substantial diffusion into said first and second magnetic recording layers.

16. The method of claim 13, wherein forming said first and second magnetic recording layers comprises forming said first magnetic recording layer comprising an $L1_0$ phase FePt compound at a temperature exceeding around 400° C. and forming said second magnetic recording layer comprising an $L1_0$ phase FePt compound at a temperature exceeding around 400° C.

17. The method of claim 13, wherein forming said high-temperature exchange break layer, said first magnetic recording layer, and said second magnetic recording layer comprises forming said high-temperature exchange break layer and said first and second magnetic recording layers that increase the signal-to-noise ratio corresponding to said recording medium as compared to a recording medium without said high-temperature exchange break layer.

18. The method of claim 13, wherein forming said high-temperature exchange break layer, said first magnetic recording layer, and said second magnetic recording layer comprises forming said high-temperature exchange break layer and said first and second magnetic recording layers that decrease the jitter corresponding to said recording medium as compared to a recording medium without said high-temperature exchange break layer.

19. The method of claim 13, wherein forming said high-temperature exchange break layer, said first magnetic recording layer, and said second magnetic recording layer comprises forming said high-temperature exchange break layer and said first and second magnetic recording layers that decrease the surface roughness corresponding to said recording medium as compared to a recording medium without said high-temperature exchange break layer.

* * * * *